(12) United States Patent
Bedell et al.

(10) Patent No.: US 6,996,568 B1
(45) Date of Patent: Feb. 7, 2006

(54) SYSTEM AND METHOD FOR EXTENSION OF DATA SCHEMA

(75) Inventors: Jeffrey A. Bedell, Arlington, VA (US); William Hurwood, Washington, DC (US); Benjamin Z. Li, Great Falls, VA (US); Fabrice Martin, Washington, DC (US); Sadanand Sahasrabudhe, McLean, VA (US); Jun Yuan, Sterling, VA (US)

(73) Assignee: MicroStrategy Incorporated, McLean, VA (US)

( * ) Notice: Subject to any disclaimer, the term of this patent is extended or adjusted under 35 U.S.C. 154(b) by 563 days.

(21) Appl. No.: 10/120,144

(22) Filed: Apr. 11, 2002

Related U.S. Application Data

(63) Continuation-in-part of application No. 10/043,286, filed on Jan. 14, 2002, now abandoned, which is a continuation of application No. 09/884,021, filed on Jun. 20, 2001, now abandoned.

(51) Int. Cl.
*G06F 17/30* (2006.01)

(52) U.S. Cl. .......................... 707/100; 707/3; 707/102; 715/500

(58) Field of Classification Search ................ 707/2–4, 707/100, 102; 715/500
See application file for complete search history.

(56) References Cited

U.S. PATENT DOCUMENTS

| | | | |
|---|---|---|---|
| 4,688,195 A | 8/1987 | Thompson | 706/11 |
| 4,829,423 A | 5/1989 | Tennant | 704/8 |
| 5,197,005 A | 3/1993 | Shwartz | 707/2 |
| 5,276,870 A | 1/1994 | Shan | 707/2 |
| 5,418,943 A | 5/1995 | Borgida | 707/4 |
| 5,421,008 A | 5/1995 | Banning | 707/4 |
| 5,555,403 A | 9/1996 | Cambot | 707/4 |
| 5,584,024 A | 12/1996 | Shwartz | 707/4 |
| 5,664,182 A | 9/1997 | Nirenberg | 707/102 |
| 5,692,181 A * | 11/1997 | Anand et al. | 707/102 |
| 5,864,856 A | 1/1999 | Young | 707/100 |
| 5,870,746 A | 2/1999 | Knutson | 707/100 |
| 5,905,985 A | 5/1999 | Malloy | 707/100 |
| 5,914,878 A | 6/1999 | Yamamoto | 700/106 |
| 5,918,225 A | 6/1999 | White | 73/1.84 |
| 5,918,232 A | 6/1999 | Pouschine | 707/103 R |
| 5,940,818 A | 8/1999 | Malloy | 707/2 |
| 5,943,668 A | 8/1999 | Malloy | 707/3 |

(Continued)

OTHER PUBLICATIONS

Gupta, Himanshu et al., "Index Selection for OLAP," IEEE 1063-6382, pp. 208-219.

(Continued)

*Primary Examiner*—Greta Robinson
*Assistant Examiner*—Cheryl Lewis
(74) *Attorney, Agent, or Firm*—Hunton & Williams LLP

(57) ABSTRACT

A system and method for defining and using logical extensions to a set of data stored in a relational database. A metadata definition for various extensions is stored to explain how to extend data as it is stored into a logical representation suitable for reporting and calculating purposes. An analytical engine translates report requests into SQL queries to access the physically stored data using the metadata extension definitions if necessary to generate appropriate results. Here, data is stored in at least one table that is physically keyed by a set of attributes with the attribute determining the granularity or level of data contained within the tables. A report request causes the engine to calculate and/or display the data at a lower level of granularity than exists, thereby invoking the metadata definitions. The extension definitions may describe how to extend data from the physical to the logical including joins and allocation rules.

24 Claims, 5 Drawing Sheets

U.S. PATENT DOCUMENTS

| | | | | |
|---|---|---|---|---|
| 5,943,677 | A | 8/1999 | Hicks | 707/205 |
| 5,970,476 | A | 10/1999 | Fahey | 705/28 |
| 5,978,796 | A | 11/1999 | Malloy | 707/3 |
| 6,094,651 | A | 7/2000 | Agrawal | 707/5 |
| 6,122,636 | A | 9/2000 | Malloy | 707/102 |
| 6,154,766 | A | 11/2000 | Yost | 709/201 |
| 6,195,653 | B1 * | 2/2001 | Bleizeffer et al. | 707/2 |
| 6,233,583 | B1 * | 5/2001 | Hoth | 707/102 |
| 6,247,008 | B1 | 6/2001 | Cambot | 707/3 |
| 6,279,033 | B1 | 8/2001 | Selvarajan | 709/217 |

OTHER PUBLICATIONS

Ho, Ching-Tien et al., "Partial-Sum Queries in OLAP Data Cubes Using Covering Codes," ACM 0-89791-910-6, pp. 228-237.

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Buiding Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Verison 5.1 (electronic copy on enclosed CD).

GIS/LIS'88 Proceedings accessing the world, vol. 2 pp. 741-750.

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add-In MicroStrategy Objects Version 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administrator Version 6.5 (electronic copy in enclosed CD).

* cited by examiner

SYSTEM AND METHOD FOR EXTENSION OF DATA SCHEMA

RELATED APPLICATION DATA

This application is a continuation-in-part of U.S. patent application Ser. No. 10/043,286 entitled "System and Method For Extension of Data Schema," filed on Jan. 14, 2002, now abandoned, which is a continuation of U.S. patent application Ser. No. 09/884,021 entitled "System and Method of Extension of Data Schema," filed on Jun. 20, 2001, abandoned.

FIELD OF INVENTION

The present invention relates to a system and method for extending data schema from that which is defined in a database to enable searching, joins, and other operations on a database, the data schema extension including a dimensional extension that creates data at a new dimension from that which exists in the database to enable otherwise impermissible actions without changing the actual data structure or creating hard-coded SQL statements.

BACKGROUND OF THE INVENTION

The increased reliance on data assets has made the ability to run reports, generate statistics and generally manipulate quantities of databases and other data resources a significant advantage for corporations, governments and other entities. However, much of the customer, transaction and other types of data warehoused by companies and others is stored in formats which were chosen long ago, which might not be compatible with current standards or which may not be easily modified to increase functionality. These drawbacks may hinder an organization's ability to mine its databases for strategic trends or other purposes.

For instance, in an example referred to as Example 1, as illustrated in FIG. 3, a retail organization may maintain a database with separate records for corporate Sales and Budget. The organization may market goods grouped into categories, such as clothes or furnishings, with individual brands or items populating each category. In the illustrated data schema, the Sales record may be set up with fields or keys for day (date), items and stores, whereas the Budget record may be configured with month, category and store fields. Suppose that the organization would like to compare its budget for a given day of the year against the actual sales for that date.

According to the database structure shown in FIG. 3, it is impossible to make that comparison or run that report for a selected date without some complications. In many situations, additional logic must be created to generate a correct report. The search logic of most database platforms requires that a common field be found to create a match and generate an output based on that key field search. The Budget record however only contains a field for the budget on a monthly, rather than daily, basis and no match may be made on daily sales or totals between the two illustrated records.

Moreover, searches, comparisons or reports may not be able to be run between two separate databases, or the records therein, if some schema commonality can not be found. This reduces the analytic effectiveness of data resources.

Other problems exist.

SUMMARY OF THE INVENTION

The present invention provides a system and method for enabling a database designer to extend physical data (e.g., monthly data) to different dimensions than exist in the database to allow reporting and calculations. An extension definition plus engine logic to interpret the extensions enable reporting and calculations without double counting or requiring hard coded SQL or alteration of data in the database (either by changing tables or creating database views). overcoming these and other problems in the art relates in one regard to a system and method for extension of data schema in which the native data structures of a databases may be extended or abstracted to create matchable fields for query, report and other purposes. In one embodiment, the invention may permit the automatic generation of virtual fields in one or more comparative records to create an ability to find a match, make a comparison or join or perform other operations which would not be possible when the data schema are not congruent.

Accordingly, the present invention provides a system for defining and using logical extensions to a set of data stored in a relational database. A metadata definition for various extensions is stored to explain how to extend data as it is stored into a logical representation suitable for reporting and calculating purposes. An analytical engine translates report requests into SQL queries to access the physically stored data using the metadata extension definitions if necessary to generate appropriate results. Here, data is stored in at least one table that is physically keyed by a set of attributes with the attribute determining the granularity or level of data contained within the tables. A report request causes the engine to calculate and/or display the data at a lower level of granularity than exists, thereby invoking the metadata definitions. The extension definitions may describe how to extend data from the physical to the logical including joins and allocation rules.

Various types of joins may be employed, including cross joins or Cartesian joins between the existing key and the extended attribute, a partial join that joins all related attributes to the existing data table with the common keys found in the relational database table used for the extension, a smart join with the ability to perform a join other than a "direct join" (such as a correlated sub select) to ensure double counting does not occur due to the join selection, calculations to replicate data across the extended attribute or calculations to allocate by applying either a simple or complex expression to a value stored in the existing physical database across the extended attribute keys.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
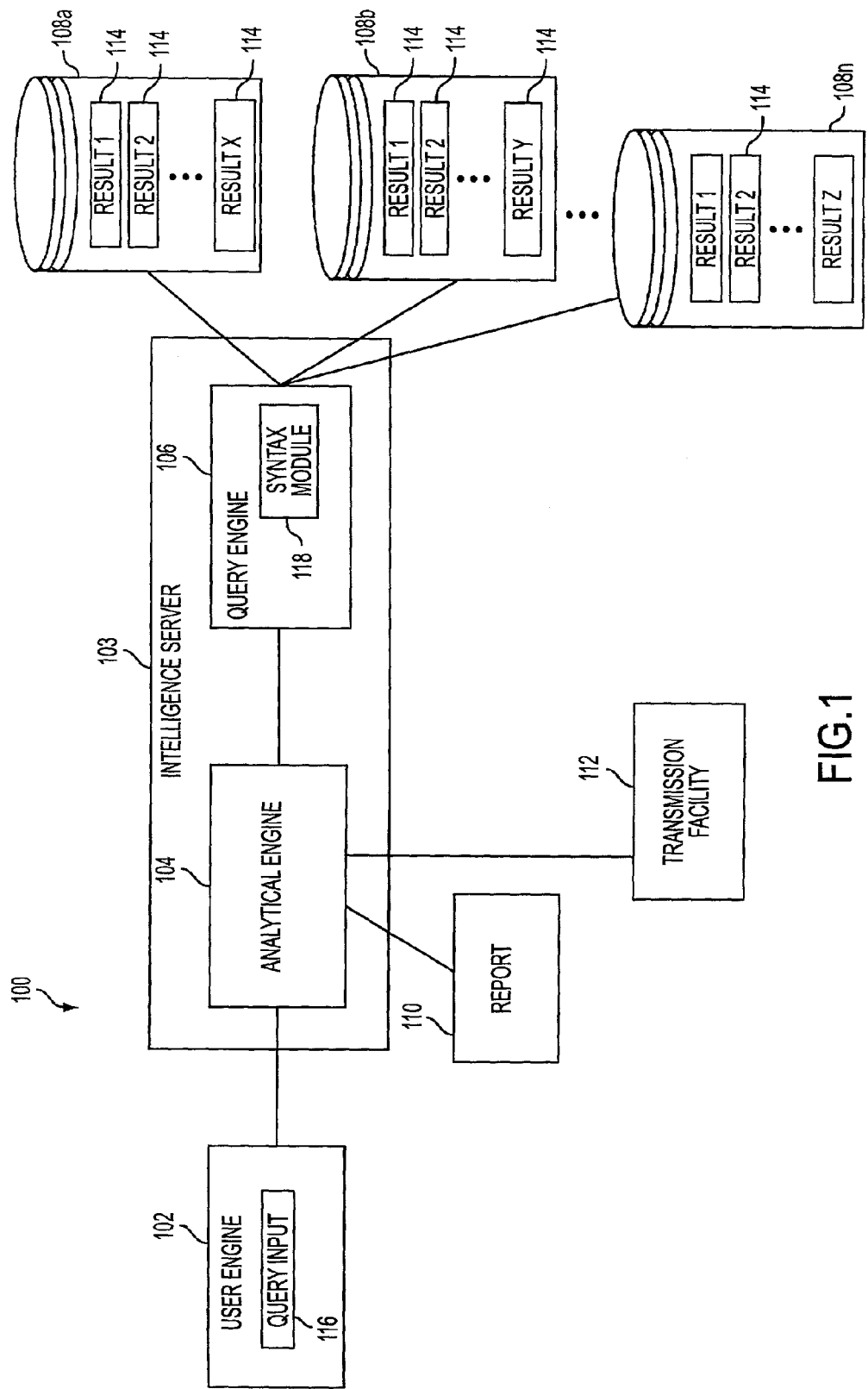
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b ... 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b ... 108n, depending on which of the data resources produce hits from processing the search query. In some embodiments of the system 100 of the invention, the results 114 may be maintained on one or more of the data storage devices 108a, 108b ... 108n to permit one or more refinements, iterated queries, joins or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b ... 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcastem™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
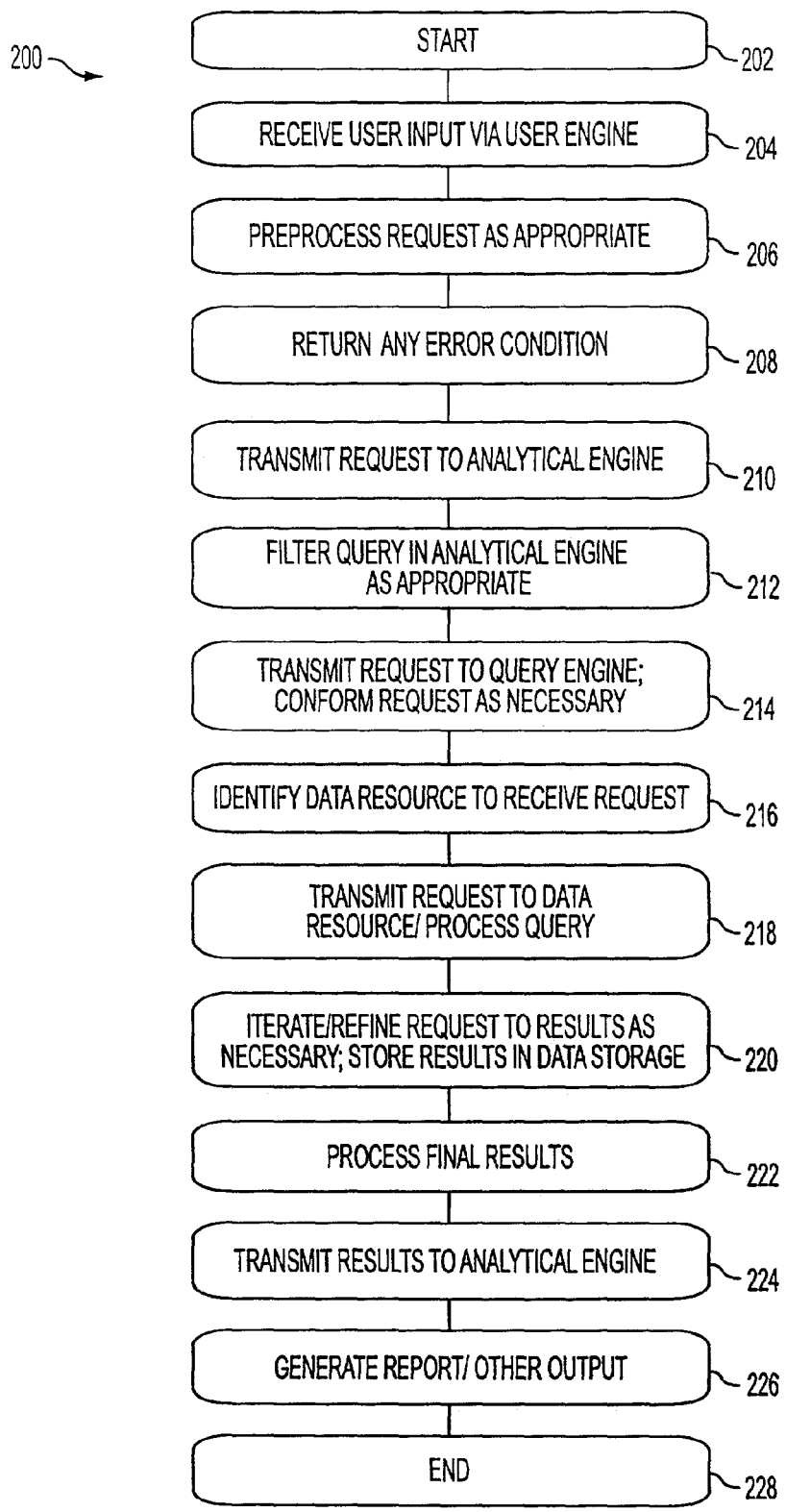
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b ... 108n. In step 216, one or more appropriate databases or other resources within the data storage devices 108a, 108b ... 108n may be identified to be accessed for the given query.

In step 218, the query may be transmitted to the data storage devices 108a, 108b ... 108n and the query may be processed for hits or other results 114 against the content of the data storage devices 108a, 108b ... 108n. In step 220, the results 114 of the query may be refined, and intermediate or other corresponding results 114 may be stored in the data storage devices 108a, 108b ... 108n. In step 222, the final results 114 of the processing of the query against the data storage devices 108a, 108b ... 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
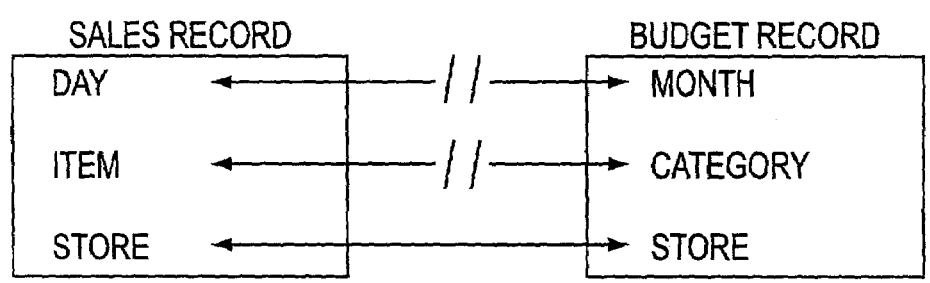
FIG. 3 illustrates a conventional data schema for an illustrative retail application.
Figure 4:
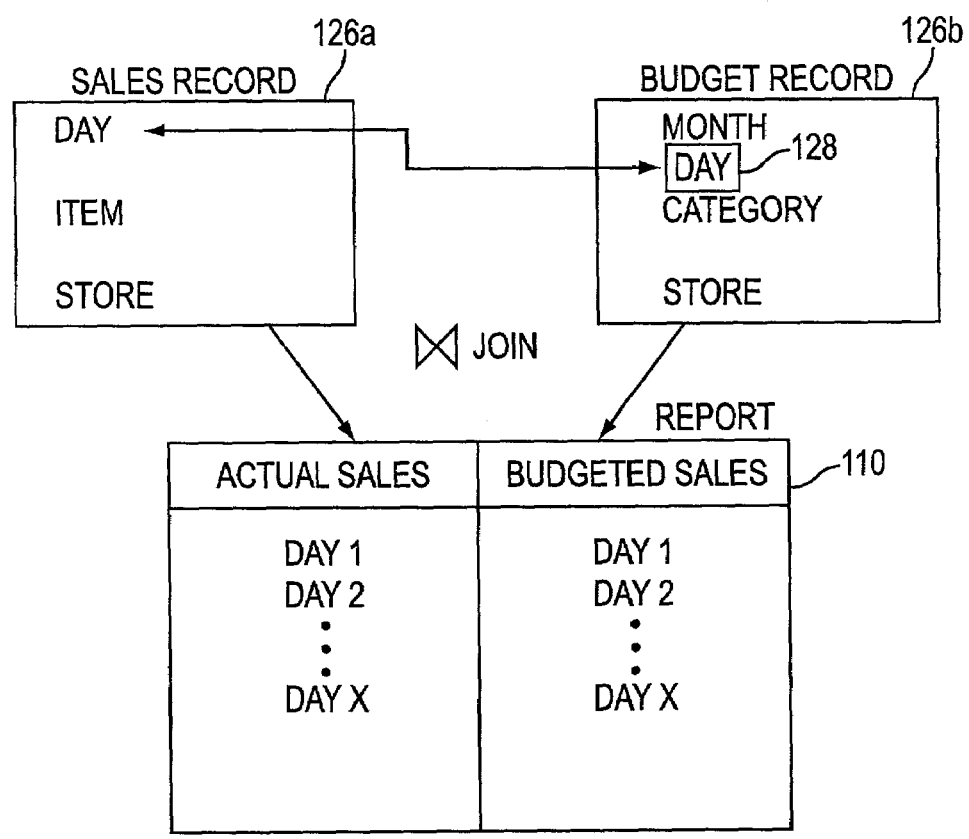
FIG. 4 illustrates a data schema according to an embodiment of the invention.

In an embodiment of the invention illustrated in FIG. 4, a user may desire a report 110 indicating actual sales versus budgeted sales for one or more given dates. In this example, the data storage devices 108a, 108b ... 108n may contain a sales record 126a and a budget record 126b, but as in the example illustrated in FIG. 3, the budget record 126b may not contain a day field within its original schema. To permit a report 110 of the desired type, however, according to the invention an extended field 128 for day may be generated to permit joins or other operations between the sales record 126a and the budget record 126b.

The extended field 128 may be generated whenever the engine determines that an extension is desired to generate a report by accessing the metadata definition of the extension. For instance, the existing month field of the budget record 126b may be divided by 30 (or another appropriate number of days for a given month being operated on), to create an allocated daily average as the extended field 128. Other techniques of deriving the day field into the budget record may be used and specified by the user in the extension definition. For instance, a yearly total could be run on the budget record 126b and the result divided by 365 days. Or, more involved statistical calculations could be run.

Although illustratively described in terms of generating an average daily sales figure from a monthly total, it will be appreciated that other types of quantitative and non-quantitative data may be processed to create extended field 128. For instance, if customer data were recorded on regional fields, mailing addresses could be used to separate customers into groups by state as a extended field 128, if geographical division was desired. Other treatments are possible.

There are several types of extensions that may be defined, including a table extension. This is best explained with reference to an example. For example, in a Table Extension Example, suppose that in a relational database, facts exist at the contract-office level (fact1) and at the contract-office-person level (fact2). A fact1 applies to all persons related to the contract-office. If a report is desired to generate a report with office, contract person and fact 1 and fact 2, then the data has to be extended such that fact 1 is allocated to every person through a fact extension. To do so, the user may define a table extension and specifies a single table or relation. In Example 4, fact1 is extended to person (a field in Table 2), using Table 2 as the table extension. The keys for this are office and contract. Through the table type of extension, Fact1 "appears" at the level of office, contract, and person.

Another type is a fact extension, a fact is used to extend data to another dimension. Suppose a database with three tables: an item table with price information for each item, a table showing item, store and data (listing units sold of each item and at a store) and a table showing item, region and data. If price is extended to the store and data level using the fact extension on units, then price appears at the level of item, store, and data for purposes of aggregation, even to the region level. If this is done, however, aggregation to region may cause errors due to double counting. In such a case, an alternative join method may be using temporary tables or correlated sub-query techniques.

Another type is fact allocation. Fact is lowered and changed by some allocation formula. In this case, a smart join may not be used, if desired. For example, suppose a table with sales by department and percentage and department id for each item, then fact allocation may be used to generate a report showing sales * percentage by item id.

Other examples of dimensionality problems that may exist in a database include the following. Example 2: Suppose a relational database has a table for departmental sales (using department ID as a key) and another table for indicating items sold by a department. If that is all of the information available in the database, then a desire to generate a report that shows the sales by item is not possible from the data in the database. To solve this problem, a degradation extension may be used. In this examples, the system enables a user to define a dimensional degradation to lower data to the next level of detail beyond that shown in the database. To do so, the user defines how the system is to lower the dimensionality of a fact using a dimensional relationship. In this example, the total sales by department may be degraded to the item level (one level down from departmental sales) in a field or extended field on the fly for purposes of execution of a particular report through the definition of a degradation type of dimensional extension stored for use with the report. The degradation dimensional extension may use any of a variety of allocation techniques, including pro rata, straight division or any other scheme. In execution of this process, degraded facts may be aggregated to get to the parent attribute, although caution must be used because the allocation is not derived and not actual. Double counting may occur.

Similarly, if a retail chain sells an item at the same price regardless of where one of its stores is located, to conserve data space, the store's relational database may not want to store for every item sold the price. Instead, the retail store's database may store units sold by store and data. If a report is desired showing amount sold by store by date, then the data needs to be extended to apply price to every item to determine the amount sold, rather than simply the units. A dimensional extension may define that the price fact in the one table applies to all items in the other tables to enable dollar sales calculation.

In another example, a many to many relationship may exist in a database. Facts may exist at an attribute level and a many-to-many relation may exist between attributes. Here a dimensional extension may be defined to extend all facts to a level of a parent attribute across the many-to-many relationship. Therefore, extended facts may be aggregated to a parent attribute. Double counting may inherently occur, therefore, smart joins may be employed to limit its effect.

To handle this, the metadata engine may be provided with a list of extension types and a manner of processing them. In addition, the engine handles double counting and joins intelligently.

Figure 5:
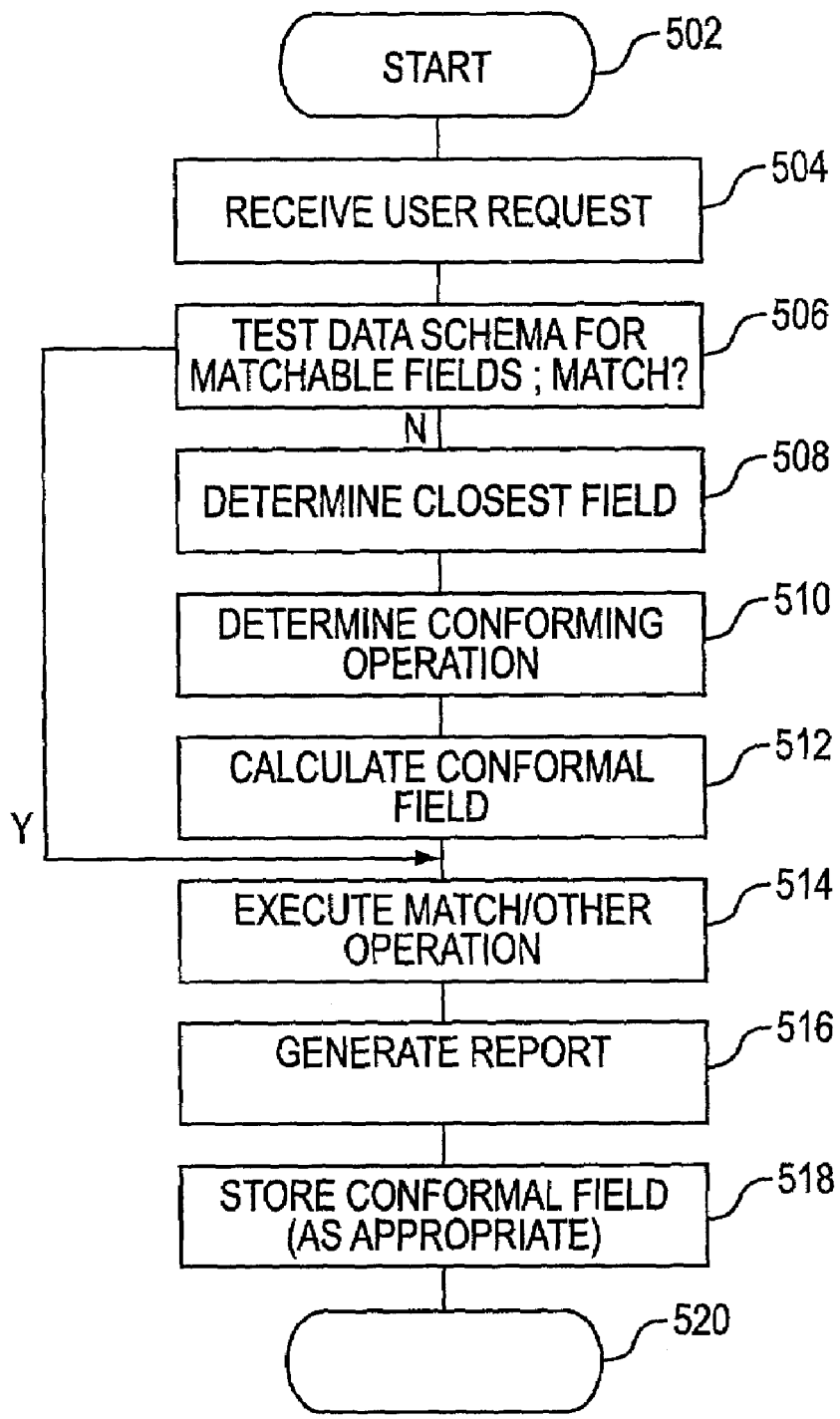
FIG. 5 is a flowchart illustrating steps performed by a process for schema abstraction, according to an embodiment of the invention.

A flowchart illustrating schema processing according to the invention is show in FIG. 5. In step 502, processing begins. In step 504, a request is received from a user for a report 110 or other desired search or output. In step 506, the data schema of the data stored in the data storage devices 108a, 108b . . . 108n may be tested to determine if the available fields of the records contained therein permit a match across desired records. If a set of matchable keys or fields exist, processing proceeds to step 514.

If no matchable fields exist, in step 508 a closest field in one or more records may be determined. In step 510, a conforming operation needed to adapt the closest field to a matchable condition may be determined based on extension definitions stored. For instance, the extension operation may be an average or other operation. In step 512, the extended field 128 may be generated, as for instance by calculation of an average or other value.

In step 514, a match may be executed between the extended field 128 and matching fields of other records in the data storage 108a, 108b . . . 108n, or if existing matchable fields existed in step 506, those fields are keys may be matched. In step 516, a report 110 or other output may be generated using the results of that record join, comparison or other operation. In step 518, the extended field 128 may be temporarily or permanently stored if desired, for instance to facilitate further reports or other operations. In step 520, processing ends.

The foregoing description of the invention is illustrative, and variations in configuration and implementation will occur to persons skilled in the art. For instance, while the invention has generally been described in terms of the generation of a single extended field 128, multiple extended fields could be generated in different implementations. Likewise, although the invention has generally been described in terms of the modification of a single existing field to generate the extended field 128, multiple existing fields could be used to derive one or more extended field 128. Yet further, while the invention has generally been described in terms of the comparison of two records, in implementations multiple records could be tested, conformed and joined. The scope of the invention is accordingly to be limited only by the following claims.

What is claimed is:

1. A system for generating reports from data in a defined data schema comprising:
   a set of data stored in tables in a database according to a defined physical data schema;
   a report request system for receiving a request for a report;

means for storing a schema extension definition explaining how to apply an extension to data in the physical data schema to a logical data schema, the extension definition serving to extend data in the physical data schema to at least one different dimension than exists in the physical data schema without requiring hard-coded SQL statements; and a engine for generating a report using the definition of a schema extension to generate a logical data schema and applying at least one operation on the logical data schema.

2. The system of claim 1 wherein the data stored in the defined physical data schema is keyed by a set of attributes, with the attribute determining the level of data contained in the tables in the data schema.

3. The system of claim 2 wherein the schema extension definition defines a dimensional extension to extend data from one level of data to a different level of data within the same or different dimension.

4. The system of claim 3 wherein the schema extension definition comprises a fact extension.

5. The system of claim 3 wherein the schema extension definition comprises a table extension.

6. The system of claim 3 wherein the schema extension definition comprises a fact allocation.

7. The system of claim 3 wherein the schema extension definition comprises a many-to-many extension.

8. The system of claim 3 wherein the report request requires output from data at a different level of data than in the physical data schema and wherein the engine uses the dimensional extension to generate the logical data as one step in generating the report in response to that request.

9. The system of claim 1 wherein the schema abstraction definition comprises a join and one or more allocation rules.

10. The system of claim 9 wherein the join comprises a cross join between an existing key and an extended attribute.

11. The system of claim 10 wherein the join comprises a partial join that joins related attributes in the physical data table with the common keys found in the relationship table used for the extension.

12. A method for generating reports from data in a defined data schema having a set of data stored in tables in a database according to a defined physical data schema, the method comprising the steps of:

enabling a user to define one or more schema extension definition explaining how to apply an extension to data in the physical data schema to a logical data schema, the extension definition serving to extend data in the physical data schema to at least one different dimension than exists in the physical data schema without requiring hard-coded SQL statements; and receiving a request for a report;

generating a report using one or more of the schema extension definitions to generate a logical data schema and applying at least one operation on the logical data schema.

13. The system of claim 12 wherein the join comprises a smart join to ensure double counting does not occur.

14. The method of claim 12 wherein the data stored in the defined physical data schema is keyed by a set of attributes, with the attribute determining the level of data contained in the tables in the data schema.

15. The method of claim 12 wherein the schema extension definition defines a dimensional extension to extend data from one level of data to a different level of data.

16. The method of claim 15 wherein the schema extension definition comprises a fact extension.

17. The method of claim 15 wherein the schema extension definition comprises a table extension.

18. The method of claim 15 wherein the schema extension definition comprises a fact allocation.

19. The method of claim 15 wherein the schema extension definition comprises a many-to-many extension.

20. The method of claim 15 wherein the report request requires output from data at a different level of data than in the physical data schema and wherein the engine uses the dimensional extension to generate the logical data as one step in generating the report in response to that request.

21. The method of claim 12 wherein the schema abstraction definition comprises a join and one or more allocation rules.

22. The method of claim 21 wherein the join comprises a cross join between an existing key and an extended attribute.

23. The method of claim 22 wherein the join comprises a partial join that joins related attributes in the physical data table with the common keys found in the relationship table used for the extension.

24. The system of claim 22 wherein the join comprises a smart join to ensure double counting does not occur.

* * * * *